United States Patent [19]

Akatsu et al.

[11] Patent Number: 5,580,952
[45] Date of Patent: Dec. 3, 1996

[54] PROCESS FOR PRODUCING AN EXTRACTION CHROMATOGRAPHY RESIN

[75] Inventors: Johkun Akatsu; Takaumi Kimura, both of Tokai-mura, Japan

[73] Assignee: Japan Atomic Energy Research Institute, Tokyo, Japan

[21] Appl. No.: 370,253

[22] Filed: Jan. 9, 1995

[51] Int. Cl.⁶ ............................................ C08G 2/20
[52] U.S. Cl. .................... 528/493; 528/487; 528/495; 528/502 R; 95/82
[58] Field of Search .................... 528/493, 487, 528/495, 502; 95/82

[56] References Cited

U.S. PATENT DOCUMENTS 3,996,213  12/1976  Schinzel et al. .................... 548/145
4,683,124   7/1987  Muscatello et al. ..................... 423/6

Primary Examiner—Nathan M. Nutter
Assistant Examiner—Duc Truong
Attorney, Agent, or Firm—Oblon, Spivak, McClelland, Maier & Neustadt, P.C.

[57] ABSTRACT

A process for producing a resin for the chromatographic extraction of metal ions is provided, the process involving:

treating an acidic bidentate organic phosphonate metal complexing agent with an alcohol or ketone solvent containing an aqueous alkaline solution, thereby forming the corresponding salt of the phosphonate compound;

mixing the bidentate organic phosphonate salt with an absorbent resin in an alcohol or ketone solvent containing an aqueous alkaline solution, thereby absorbing the phosphonate salt in the resin;

washing the resin containing bidentate complexing agent with an aqueous alcohol or ketone solution; and drying the washed resin, wherein the process provides improved chromatographic extraction of metal ions.

5 Claims, 3 Drawing Sheets

PROCESS FOR PRODUCING AN EXTRACTION CHROMATOGRAPHY RESIN

BACKGROUND OF THE INVENTION (1) Field of the Invention

The present invention relates to a process for producing an extraction chromatography resin.

(2) Description of the Prior Art

In the prior art, after adding an planned amount of extracting agent and adsorbent resin to a volatile organic solvent such as cyclohexane, the organic solvent is volatilized. In this process the resin impregnated with extracting agent is produced as an extraction chromatography resin.

Up to the present about 30 kinds of bidentate organic phosphorus compound as solvent extracting agent have been synthesized.

As a typical example there is DHDECMP (dihexyl-N,N-diethyl carbamoyl methyl phosphonate) (hereinafter called as "A agent") having the following structure:

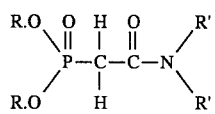

herein, R and R' are alkyl radicals, and

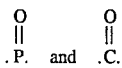

are extraction functional radicals.

In the production of this solvent extracting agent, organic byproducts are produced and remain, even after purification. In particular an acidic organic phosphorus compound (hereinafter called as "B agent") as shown in the following structure:

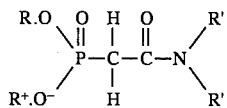

herein, R and R' are an alkyl radical, is open to question.

Besides the above mentioned extraction functional radicals, hydrogen atom of OH combined to P dissociates to become a cation exchanger.

Though also this cation exchanger acts as an extracting agent, because A agent and B agent are different in extraction mechanism, in case of separating two kinds of metal ion, the separation effect is deteriorated.

That is, in the prior art, a both A and B agents-loading chromatography resin has been produced, which, as shown in FIG. 1, shows almost the same behaviors when extracting trivalent americium and curium from a nitric acid solution.

In FIG. 1, abscissa represents concentration of nitric acid solution (M) and ordinate, distribution ratio (Kd). Mark o shows a datum of trivalent americium and ● is of curium.

SUMMARY OF THE INVENTION

An extraction chromatography resin is produced as wet process by washing an organic phosphorus compound extracting agent with alcohol (or ketone)-containing alkaline aqueous solution, mixing the agent with an absorbent resin in fresh alcohol (or ketone)-containing alkaline aqueous solution for about four hours, washing the obtained resin with fresh alcoholic (or ketone) aqueous solution, and at last drying it.

DESCRIPTION OF THE PREFERRED EMBODIMENT

As the result of further research for solving such problem, the present inventors have found that, on the basis of the set preparing process of an extraction chromatography resin formerly invented by the present inventors (Patent Public Disclosure Gazette No. H 1-142462), an acidic organic phosphorus compound (B agent) is converted to its water soluble alkaline salt (H.O—P→Na.O—P—) , hereby a chromatography resin impregnated with pure extracting agent (A agent) can be produced. Hence, the present invention.

In the present process for producing an extraction chromatography resin, B agent is converted to a hydrophilic salt as if soap by making the aqueous phase alkaline and further the solubility thereof for aqueous phase is elevated by ading methanol to the aqueous phase. However, A agent is not influenced thereby because of being neutral.

Therefore, more pure A agent-loading chromatography resin can be first obtained only by the wet process.

To put it concretely, the present process comprises (1) washing a planned amount of organic phosphorus compound with an alcohol (or ketone)-containing alkaline aqueous solution previously, (2) mixing it with an absorbent resin in alcohol (or ketone)-containing alkaline aqueous solution for about four hours, (3) washing the obtained resin with fresh 20% alcoholic (or ketone) aqueous solution, and (4) drying the resin at 110°.

The flow sheet of the present process is shown in Table 1.

TABLE 1

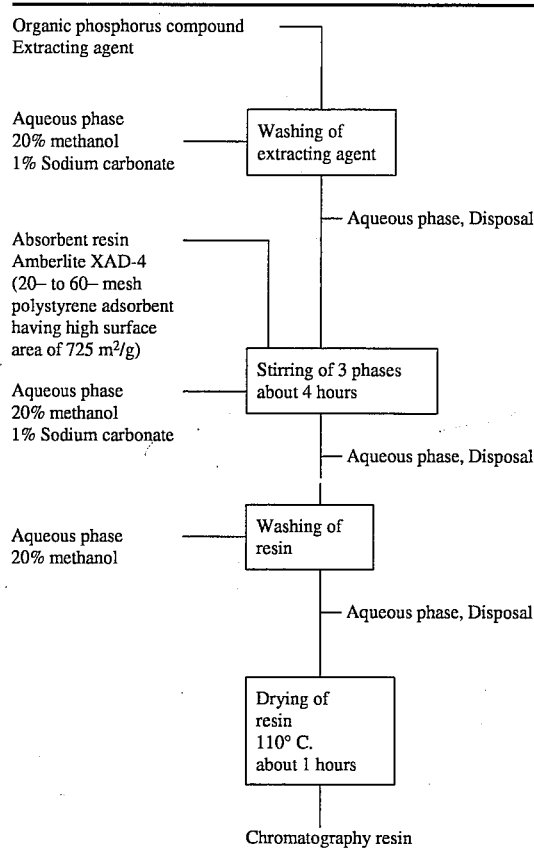

Organic phosphorus compound Extracting agent

Aqueous phase
20% methanol
1% Sodium carbonate
→ Washing of extracting agent
— Aqueous phase, Disposal Absorbent resin
Amberlite XAD-4
(20- to 60- mesh polystyrene adsorbent having high surface area of 725 m²/g)

Aqueous phase
20% methanol
1% Sodium carbonate
→ Stirring of 3 phases about 4 hours
— Aqueous phase, Disposal Aqueous phase
20% methanol
→ Washing of resin
— Aqueous phase, Disposal Drying of resin
110° C.
about 1 hours Chromatography resin When using Amberlite XAD-4, a resin particle having a large absorbing area, according to this process, a chromatography material loading 1 g of an extracting agent per 1 g of holder is obtained.

Figure 1:
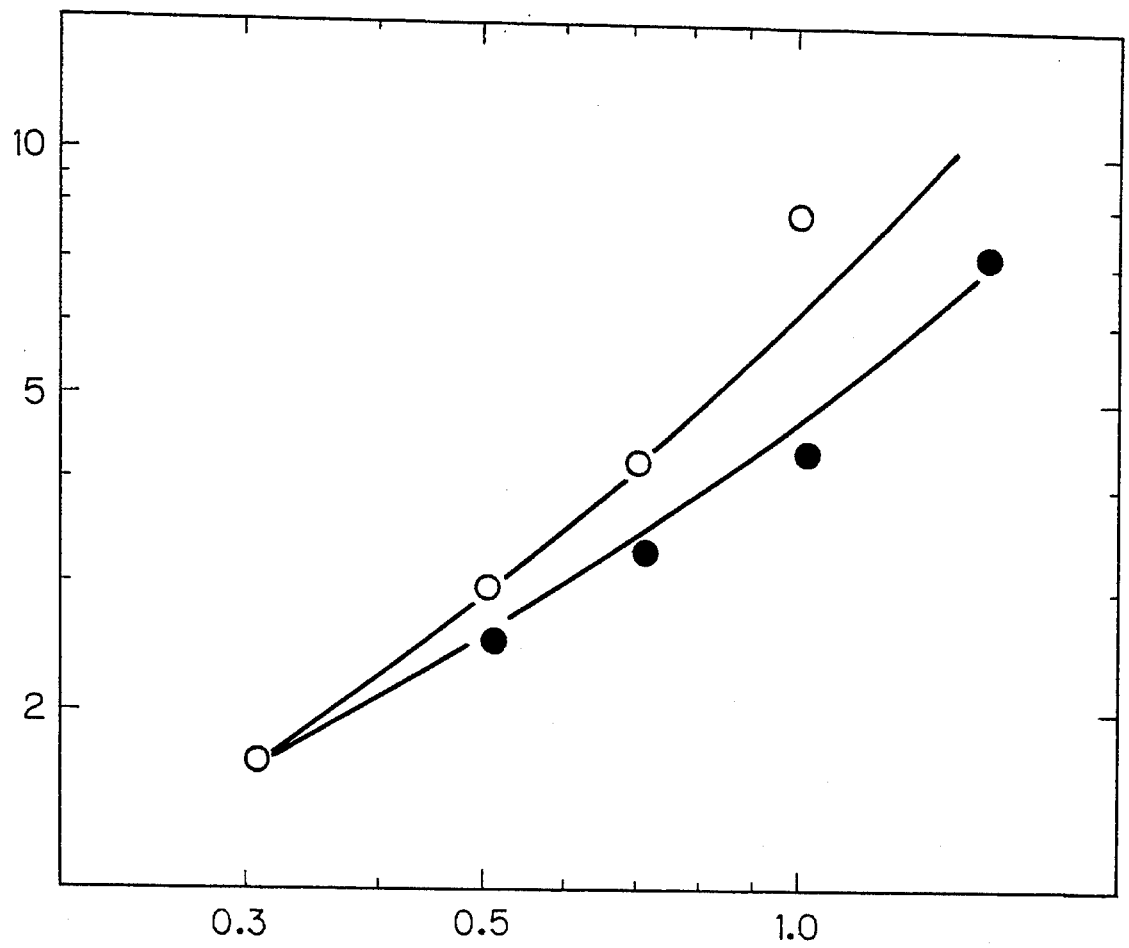
FIG. 1 is a graph showing extraction behaviors of trivalent americium and curium in the system of nitric acid solution and the resin prepared in the process of the prior art.
Figure 2:
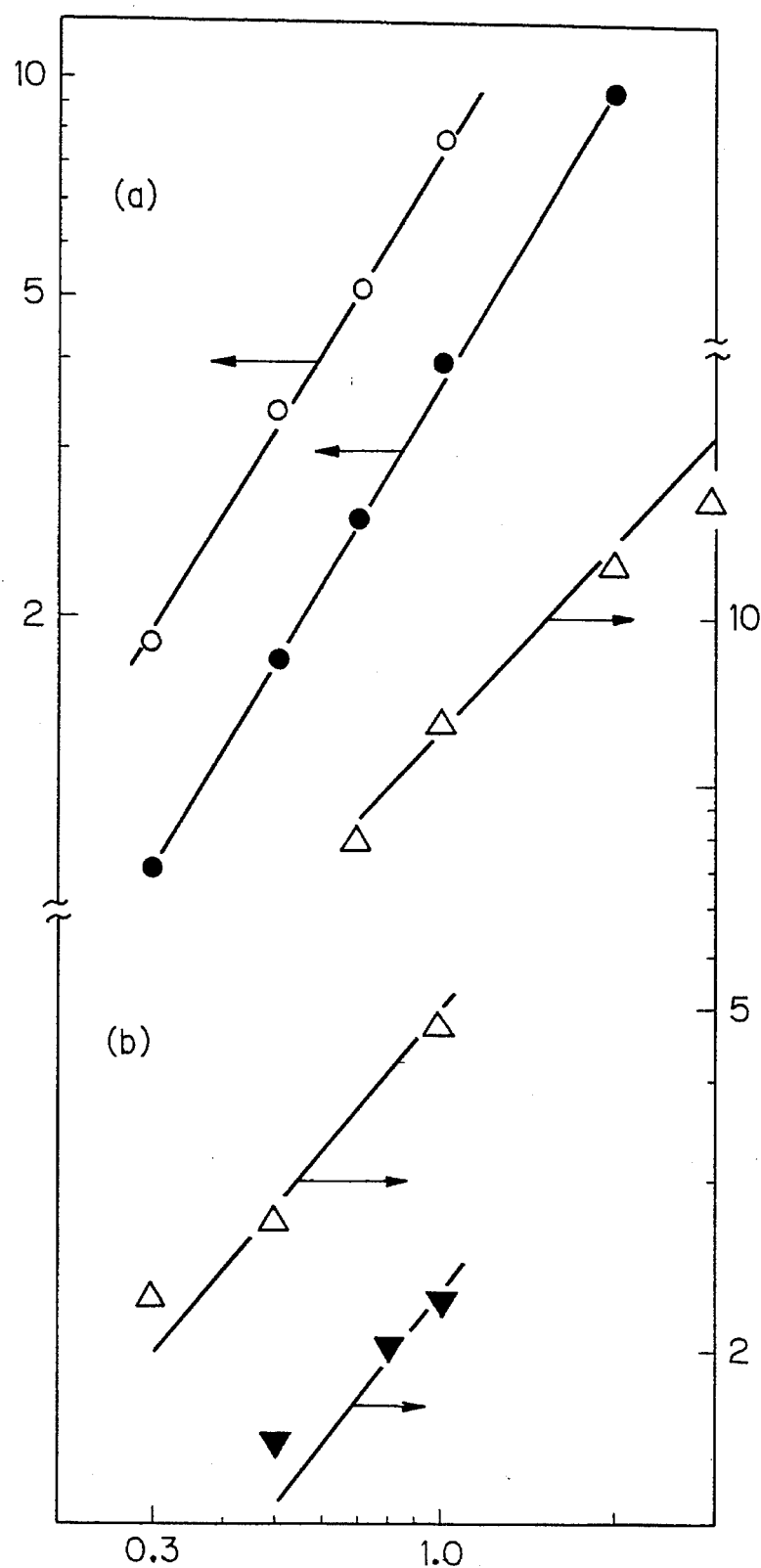
FIG. 2 is a graph showing extraction behaviors of trivalent americium and curium in the system of nitric acid solution and the resin prepared in the process of the present invention.

The behavior of resin extracted from an aqueous nitric acid solution according to the present process is shown in FIG. 2.

In (a) of FIG. 2, trivalent americium and curium are different in extraction behavior and so the separation coefficient (ratio of the both distribution ratio) is about 2.5 so that the possibility of separation is large, and, in (b), the extraction seems to be different among lanthanoids (promethium, europium) so that the separation thereof is possible.

In FIG. 2, abscissa represents concentration of nitric acid solution (M) and ordinate, distribution ratio (Kd). Mark, o shows a datum of trivalent americium and ● is of curium. Δ shows a datum of promethium and ▲ is of europium.

EXAMPLE

The separation of americium and curium was carried out by filling up the resin produced according to the process of the present invention into a column. The practice condition is as shown in Table 2 and the result of elution with 1M nitric acid solution is shown in FIG. 3.

TABLE 2

| | |
|---|---|
| DHDECMP | 1 g/1 g of holder |
| Column | 0.6φ × 20 cm |
| Resin | 80–100 mesh |
| Eluting solution | 1M Nitric acid |
| Free-column volume (F) | 1 F = 2.15 ml |
| Temperature | 22° C. |
| Flow velocity | 0.5 drop/minute |

Figure 3:
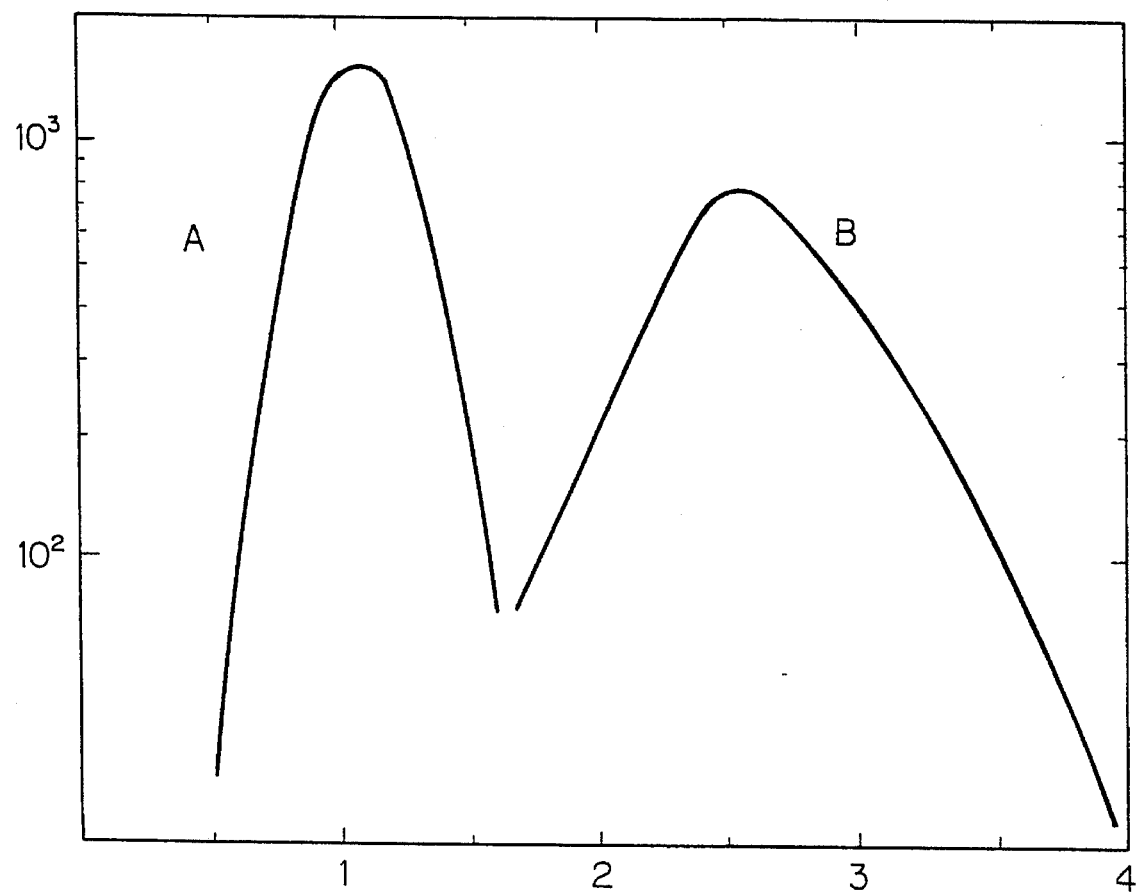
FIG. 3 is a graph showing a separation result of trivalent americium and curium in Example.

In FIG. 3, abscissa represents free-column volume (F) and ordinate, a α radioactvity strength (dpm/fraction), and curve A is a datum of curium and curve B is of americium.

What is claimed is:

1. A process for producing a resin for the chromatographic extraction of metal ions, comprising:

treating an acidic bidentate organic phosphonate metal complexing agent with an alcohol or ketone solvent containing an aqueous alkaline solution, thereby forming the corresponding salt of the phosphonate compound;

mixing the bidentate organic phosphonate salt with an absorbent resin in an alcohol or ketone solvent containing an aqueous alkaline solution, thereby absorbing the phosphonate salt in the resin;

washing the resin containing bidentate complexing agent with an aqueous alcohol or ketone solution; and drying the washed resin.

2. The process of claim 1, wherein said resin is 20 to 60 mesh polystyrene adsorbent having high surface area of 725 m²/g.

3. The process of claim 1, wherein the alcohol solvent of the steps of the process is methanol.

4. The process of claim 1, wherein said acidic bidentate organic phosphonate metal complexing agent is dihexyl-N,N-diethylcarbamoylmethylphosphonate.

5. A process for producing a resin for the chromatographic extraction of metal ions, comprising:

treating dihexyl-N,N-diethylcarbamoylmethylphosphonate with an aqueous methanolic solution containing sodium carbonate, thereby forming the sodium salt of the phosphonate compound;

mixing the bidentate organic phosphonate salt with 20 to 60 mesh polystyrene adsorbent having high surface area of 725 m²/g in an aqueous methanolic carbonate solution, thereby absorbing the phosphonate salt in the resins;

washing the resin containing bidentate complexing agent with an aqueous methanolic solution; and drying the washed resin.

* * * * *